3,416,629
METHOD OF MOVING A SEISMIC CABLE IN UNNAVIGABLE WATERS
Erwin C. Brede, Metairie, La., assignor to Texas Instruments Incorporated, Dallas, Tex., a corporation of Delaware
Filed Aug. 18, 1966, Ser. No. 573,237
1 Claim. (Cl. 181—.5)

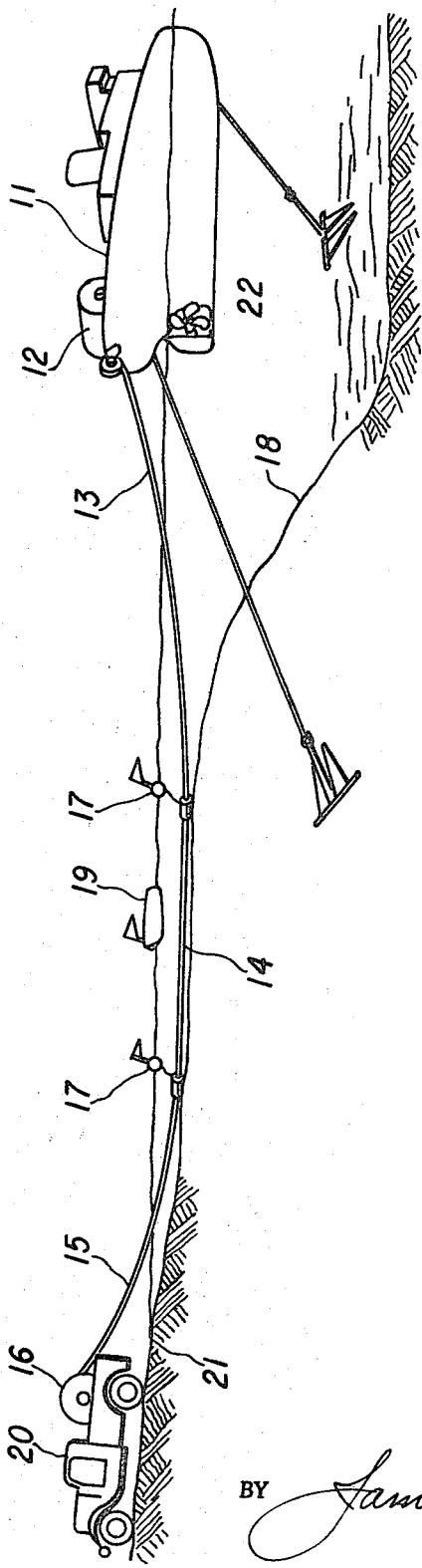

ABSTRACT OF THE DISCLOSURE

A method of seismic exploration in shallow water areas wherein a boat is anchored to provide a first control station and a land vehicle is parked to establish a second control station. These control stations are located along the desired exploration path and displaced from each other. Lines connected between the control stations and a drag-type seismic cable are manipulated to position the cable along a desired exploration path.

---

This invention relates to seismic exploration methods, and more particularly to a method of seismically exploring the land areas under shallow waters.

Recently much effort has been devoted to conducting seismic exploration of continental shelf areas in search of oil and gas deposits, particularly in the Gulf of Mexico and the North Sea. The method most commonly used involves the towing of a seismic cable from a vessel over the location to be explored and stopping to enable the cable to come to rest over a particular area. From a boat, a seismic disturbance, such as an explosion, is created at some known position, and the reflections created by the disturbance at various strata beneath the ocean floor are detected by sensors in the seismic cable, which then emit signals that are transmitted to a recorder on the towing vessel and there recorded. The sensors used are generally pressure-electrical transducers which emit electrical signals proportional to the pressure thereon and are ordinarily spaced along the length of the seismic cable, for example every 150 feet along a 3600 foot seismic cable. The electrical signals produced are transmitted along conductors to recording instruments on the towing vessel. For convenience, these conductors may be incorporated into the line by which the seismic cable is towed.

Towing vessels are generally large, frequently with lengths in excess of 100 feet and drafts in excess of 10 feet. This size, however, is necessary because the vessels must house not only the seismic crews of about 25 men, but also the processing and recording equipment used in conjunction with the seismic cable in conducting the survey. Most importantly, the vessels must have sufficient power to tow the seismic cable, which may produce a drag on the vessel of up to 4000 pounds or more. Many of these vessels have specially constructed flat bottoms to facilitate navigation as close to shore as possible, but since the waves, swells, and surfs near the shorelines are particularly heavy, even such vessels cannot safely navigate in depths of less than 30 feet.

Moreover, the heavy waves, swells, and surfs near the shoreline areas produce a serious noise problem because the sensors in the seismic cable will sense the wave and surf pressures in addition to the important reflected seismic pressure waves, making it difficult if not impossible to detect the seismic pressure waves. To aid in eliminating this wave and surf noise, the seismic cable is made to sink to the bottom of the ocean. Such a cable, as used in the art, is referred to as a drag-type seismic cable because it essentially is dragged behind the towing vessel along the ocean floor.

Thus, in using the methods and equipment described above, seismic explorations cannot be conducted in shallow water areas, such as near shorelines, islands, and the like. Although the present invention is also useful in deep water, it is particularly directed to seismic exploration in shallow waters.

Accordingly, one object of the invention is to provide a method by which seismic exploration can be conducted in those areas of a continental shelf which heretofore have been unexplorable.

A further object of the invention is to provide a method of moving a seismic cable between a land-based station and a deep water station in a manner such that the position of the seismic cable is known at any time.

Other objects, features and advantages of the invention will become apparent from the following detailed description when read in conjunction with the appended claim and the accompanying drawing wherein the sole figure illustrates diagrammatically the seismic exploration method of the invention.

Referring now to the drawing, the invention involves, in part, moving a seismic cable 14 from a vessel 11 in deep, navigable water 22 along the ocean floor 18 to the shore line 21. As shown in the drawing, the conductor line 13 from one end of the seismic cable 14 is wound on a reel 12 on the recording ship 11, anchored in the proper position. A cable, line, rope, or the like 15, connected to the other end of the seismic cable 14, is wound on a land-based reel 16 which is mounted on a vehicle 20, such as a truck, to facilitate moving the cable from one area to another. Maintaining radio contact between the land-based station 20, the deep water station 11, and the boat 19 from which the seismic disturbance is created is desirable in order to coordinate the activities carried on at each station. The seismic cable 14 is then in a position to be longitudinally moved over a path between the shore and the towing vessel as the reels are driven.

To specifically locate the seismic cable 14 from the towing vessel 11, the conductor cable 13 and the cable 15 to the land-based station are marked at specified distances, perhaps every 300 feet, by identifying marks, interwoven color codes, or the like. To particularly locate the seismic cable 14 from the boat 19 from which the seismic disturbance is created, buoys 17 are attached to the seismic cable at various points, perhaps at the ends of the cable as shown and at some intermediate point (not shown).

Once the system has been set up as above described, the seismic cable 14 can be positioned by manipulating the lines to the reels 12 and 16 on the vessel 11 and the vehicle 20, respectively. A seismic disturbance is then created from the boat 19 and its effects are recorded on the vessel 11 in the same manner as normally done in deep water seismology when the seismic cable is being towed behind the towing vessel.

The area, if small enough, may be completely explored by making just one such survey. However, a series of such surveys, made incrementally by moving the seismic cable, may be found to be necessary. Such incremental surveys along a series of paths probably will also have to be made.

After the path along which the seismic cable 14 has been traversed is surveyed, the conducting cable 13, the seismic cable 14, and the connecting cable 15 are wound up onto one of the reels, for example the reel on the vessel 11. The vessel 11 and the vehicle 20 are re-located at the ends of the new path to be surveyed. (Towing the seismic cable laterally to a new path is impracticable because the forces upon it would be considerable and probably would damage it.) To re-establish the system at a new location, a small boat tows the connecting cable from the reel upon the vessel to the reel on the vehicle. The system is then ready to survey the new path.

This method can also be used in deep water seismology by moving the seismic cable between two anchored vessels in the same manner as above described as between an anchored vessel and a land vehicle. Or the method can be applied in bays by moving the seismic cable between two land-based vehicles, one on each side of the bay. Furthermore, the seismic cable can be moved over curved or otherwise complicated paths by controlling lines from three or more fixed stations to the seismic cable.

Although the present invention has been described in detail, various changes, substitutions and alterations can be made therein without departing from the spirit and scope of the invention as defined in the appended claim.

What is claimed is:

1. The method of conducting seismic exploration in water over an area between land and deep water, comprising the steps of:
    (a) positioning a vessel over a fixed point in said deep water;
    (b) positioning a vehicle on a fixed point on said land;
    (c) positioning a seismic cable in an area between said land and said deep water by manipulating lines connecting the ends of said seismic cable to driven reels mounted on said vessel and said vehicle;
    (d) producing a seismic disturbance and recording the effects of said disturbances;
    (e) repeating the steps of positioning said seismic cable, producing said disturbance, and recording the effects thereof along the path between the aforementioned fixed points;
    (f) relocating said vessel and said vehicle to new fixed points by winding said seismic cable and its connecting lines onto the reel mounted on said vessel, moving said vessel and said vehicle to said two new fixed points, and repositioning said seismic cable in the aforedescribed manner; and
    (g) repeating steps (e) and (f) over other parts of the area until the entire area is explored.

References Cited
UNITED STATES PATENTS

| | | | |
|---|---|---|---|
| 2,241,428 | 5/1941 | Silverman | 340—7 |
| 2,592,780 | 4/1952 | Woods | 340—7 |
| 3,212,600 | 10/1965 | Hensley | 340—7 X |
| 3,331,050 | 7/1967 | Kilmer et al. | 340—7 |

BENJAMIN A. BORCHELT, *Primary Examiner.*

T. H. WEBB, *Assistant Examiner.*

U.S. Cl. X.R.

340—7